United States Patent [19]
Melby

[11] Patent Number: 4,867,356
[45] Date of Patent: Sep. 19, 1989

[54] HITCH MOUNT FOR CLAY PIGEON SHOOTER

[76] Inventor: George R. Melby, 15534-96th St. NE., Elk River, Minn. 55330

[21] Appl. No.: 106,729

[22] Filed: Oct. 8, 1987

[51] Int. Cl.$^4$ ................................................ B60R 9/00
[52] U.S. Cl. ............................ 224/42.03 R; 224/42.07
[58] Field of Search ................. 224/42.03 R, 42.03 A, 224/42.03 B, 273, 274, 42.01, 42.07

[56] References Cited
U.S. PATENT DOCUMENTS 4,412,635  11/1983  Bateman ........................ 224/42.03 R
4,576,395  3/1986   Longoria ................. 224/42.03 R X
4,646,952  3/1987   Timmers ................. 224/42.03 R X Primary Examiner—J. R. Scott
Attorney, Agent, or Firm—Merchant, Gould, Smith, Edell, Welter & Schmidt

[57] ABSTRACT

A device is disclosed for universally mounting clay pigeon shooters to a motor vehicle hitch. The hitch has a tongue of predetermined rectangular cross section and a hitch ball mounted at the end of the tongue. The hitch mounting device includes a body member with a mounting portion for receiving and supporting the clay pigeon shooter, and a hitch connecting portion. The hitch connecting portion includes a sleeve which fits over and surrounds the hitch ball, and a pair of side members disposed in parallel, spaced relation and defining a channel therebetween. The channel receives the hitch tongue with the first and second side members overlying the tongue sides. A plurality of threaded bolts or screws are threaded through each side member for clamping engagement agaisnt the tongue sides to rigidly hold the device in place.

18 Claims, 4 Drawing Sheets

HITCH MOUNT FOR CLAY PIGEON SHOOTER

The invention broadly relates to mounting objects to conventional trailer hitches, and is specifically directed to a hitch mounting device for clay pigeon shooters.

Hitch mounting devices for clay pigeon shooters are not themselves novel. Prior art devices exist that permit sportsmen to mount clay pigeon shooters directly to the trailer hitch of a car or truck. However, such prior art devices have encountered a number of problems.

For example, prior art hitch mounting devices tend to be fairly complex, heavy, difficult to use and relatively expensive. Some hitch mounting devices actually cost more than the clay pigeon shooter itself, which provides little economic incentive to the sportsman to make such a purchase.

Certain of these prior art devices rely entirely or to a significant degree on the ball of the trailer hitch. Because of its spherical nature, reliance on a ball and socket arrangement does not always yield satisfactory results, with the primary problem being slippage of the unit relative to the hitch. This adversely affects the proper trajectory of the clay pigeon as it is shot, and it is also possible to cause injury if the unit slips excessively.

Other problems arise with prior art devices in the inability to be mounted to any trailer hitch, or the inability to accommodate virtually all clay pigeon shooters.

This invention is the result of a desire to produce a structurally simple, easy to use and inexpensive hitching mount device for clay pigeon shooters.

The inventive device uniquely mounts to the hitch tongue rather than the ball portion of the hitch. It has been ascertained that virtually all hitches for automobiles, recreational vehicles, pickup trucks and the like include a hitch tongue formed from steel and having a rectangular cross section ranging from 2 to $2\frac{1}{2}$ inches wide with a thickness of $\frac{1}{2}-\frac{3}{4}$ inches. By mounting directly to the hitch tongue, the relatively small variation in hitch tongue size can be easily accommodated with a single device, and dependence on the ball portion of the hitch is eliminated.

More specifically, the inventive device includes a hitch mounting portion which in the preferred embodiment includes a cylindrical or square sleeve for accommodating (fitting over) the ball portion of the hitch. The mounting structure comprises a pair of downwardly extending side members disposed in parallel, spaced relation that define a bottom facing channel sized to receive the hitch tongue. Clamping means in the form of bolts or screws extending inwardly through the side members clamp against the tongue sides and hold the mounting device rigidly thereto.

The ball hitch accommodating sleeve may engage but does not depend on the ball for mounting rigidity. As such, it can be sized to accommodate different size ball hitches, which currently come in $1\frac{7}{8}$ inch and 2 inch diameters.

The outboard or mounting end of the device preferably includes an array of mounting holes that will accommodate the clay pigeon shooters of virtually all manufacturers.

The inventive device is structurally simple and easily used. Connection to the hitch is accomplished by simply placing the device over the ball portion of the hitch with the hitch tongue received in the downward facing channel, and tightening the clamping bolts against the tongue sides. This results in a rigid and stable connection that will permit repeated use of the clay pigeon shooter for extended periods of time. The unit is also low cost, and as hereinabove mentioned, will accommodate the clay pigeon shooters of virtually all manufacturers as well as fit on virtually all trailer hitches.

DESCRIPTION OF THE PREFERRED EMBODIMENTS

Figure 1:
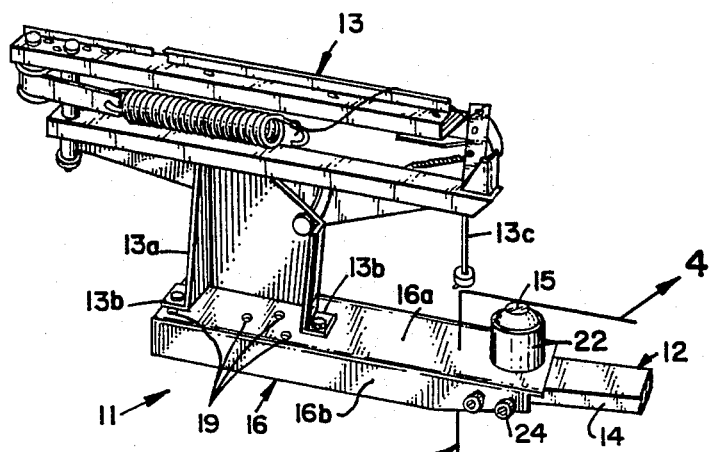
FIG. 1 is a perspective view of an inventive hitch mounting device for a clay pigeon shooter with the shooter mounted thereon.

With initial reference to FIGS. 1-5, an inventive hitch mounting device for clay pigeon shooters is represented generally by the numeral 11. The hitch mount device is connected to a hitch bearing the general reference numeral 12, and a clay pigeon shooter represented generally by the numeral 13 is mounted on the hitch mounting device 11.

Hitch 12 is of conventional construction, including a hitch tongue 14 to which a ball hitch 15 is mounted. Conventionally, hitch tongues are formed from a heavy steel bar of rectangular cross section with a width running from two to two and one-half inches and a thickness of $\frac{1}{2}-\frac{3}{4}$ inches. It is this standard size which permits the hitch mounting device 11 to be universally mounted on virtually any hitch.

Figure 4:
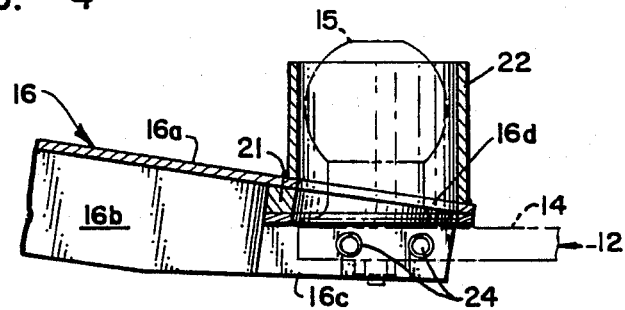
FIG. 4 is an enlarged fragmentary sectional view taken along the line 4—4 of FIG. 1.
Figure 5:
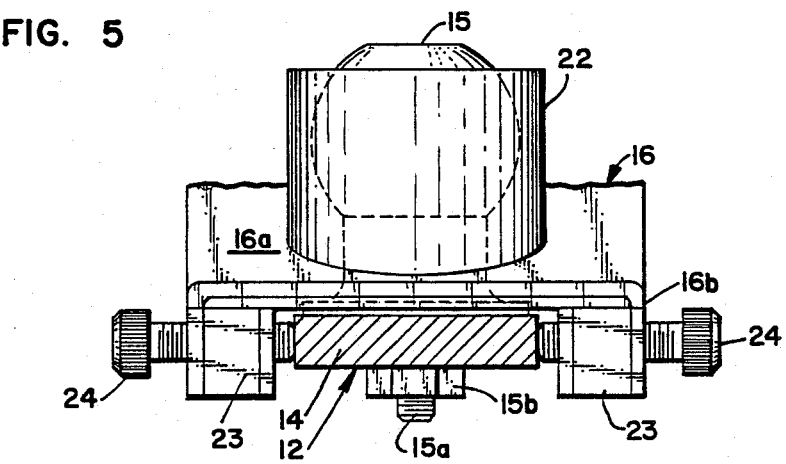
FIG. 5 is an enlarged fragmentary sectional view taken along the line 5—5 of FIG. 2.

With specific reference to FIGS. 4 and 5, ball hitch 15 is also of conventional construction, including a threaded shank 15a that projects through an aperture formed in the end of tongue 14 and secured by a nut 15b. Conventionally, ball hitches of this type have a diameter of $1\frac{7}{8}$ inches or 2 inches, and the hitch mounting device 11 utilizes these standard dimensions for universal application.

As will be described in further detail below, the hitch mounting device 11 is adapted to receive and support the clay pigeon shooters of different manufacturers. The clay pigeon shooter 13 shown is the Trius Bird Shooter manufactured by Trius Products, Inc. of Cleves, Ohio.

With continued reference to FIGS. 1-5, the hitch mounting device 11 includes a body 16 having a mounting portion 17 for receiving and supporting the shooter 13 and a hitch connecting portion 18. Body 16 specifically comprises a thick metal plate having a flat top portion 16a with downturned shorter sides 16b. The sides 16b are disposed in substantially parallel, spaced relation and together define a channel therebetween for receiving the hitch tongue 14 with the sides 16b overlying the sides of the tongue 14 (FIG. 5).

Figure 2:
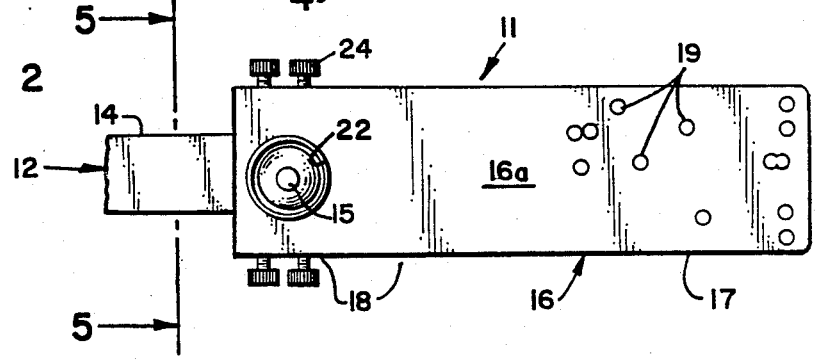
FIG. 2 is an enlarged view in top plan of the inventive hitch mounting device with the clay pigeon shooter removed.

With reference to FIG. 2, an irregular array of mounting holes 19 are formed through the top plate 16a in the outboard mounting portion 17. The array of mounting holes 19 is known in the art, and permits the mounting portion 17 to receive and support the clay pigeon shooters of virtually all manufacturers.

Figure 3:
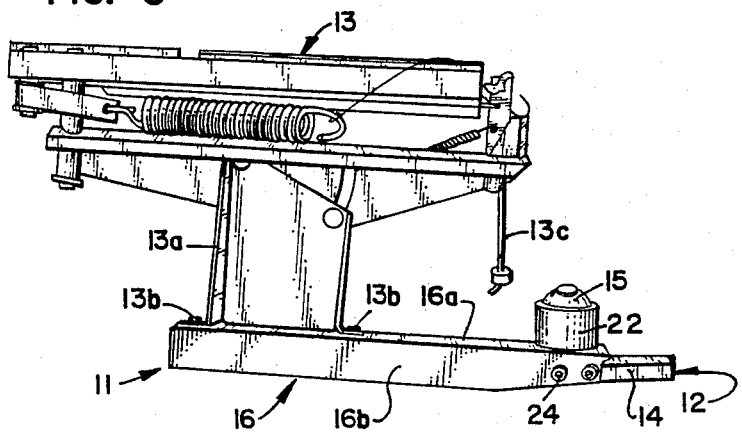
FIG. 3 is a view in side elevation of the inventive hitch device with the clay pigeon shooter mounted thereon.

As shown in FIGS. 1 and 3, the clay pigeon shooter 13 has a large mounting bracket 13a with spaced feet 13b with apertures formed throughout that correspond and register with two of the mounting holes 19 in the body portion 17 of hitch mounting device 11.

With continued reference to FIGS. 1-5, the downturned sides 16b of mounting 16 are of uniform size and configuration over their length except at the hitch connecting end 18, where they are trimmed to form an oblique or angular bottom edge 16c. With specific reference to FIG. 4, a wedge-shaped member 21 is secured to the undersurface of the top plate 16a at the hitch connecting end 18, and the bottom surface of this wedge member 21 rests on the top surface of tongue 14 when the device 11 is in its hitch connected position. As such, and as particularly shown in FIG. 4, the body 16 is disposed at a slightly inclined angle relative to the hitch tongue 14, which prevents droop of the clay pigeon shooter 13 in the mounted position. This precludes the clay pigeons from being thrown at an undesirable low trajectory.

With continued reference to FIGS. 2, 4 and 5, a large circular aperture 16d is formed through the top plate 16a through which the ball hitch 15 may project. A cylindrical sleeve 22 having a diameter generally corresponding to that of the aperture 16d is secured to the top plate 16a (e.g., by welding) in registration with the aperture 16d. As shown in FIG. 4, the diameter of aperture 16d and cylindrical sleeve 22 is slightly greater than that of the ball hitch 15. The sleeve 22 has an angular lower edge corresponding to the angle of wedge member 21, so that the sleeve 22 surrounds the ball hitch 15 in substantially vertical relation even though the body 16 is inclined upward.

With continued reference to FIG. 5, it will be seen that the width of body 16 is greater than the width of the tongue 14, which assists in accommodating the array of mounting holes 19. To reduce the effective internal width (i.e., the channel size) of the hitch connecting end 18, a threaded block 23 is secured to the inner face of each of the sides 16b. A pair of Allen screws 24 pass horizontally through the associated side 16b and threaded block 23 for clamping engagement with the corresponding side of the tongue 14. When all four of the Allen screws 24 are tightened in clamping relation against the sides of the tongue 14, the hitch mounting device 11 is rigidly connected to the hitch 12 and the clay pigeon shooter 13 may be operated. In this mounted position, the cylindrical sleeve 22 does not provide substantial support to the connection, but prevents the device 11 from falling downward and perhaps off of the hitch if one or more of the screws 24 becomes loose for any reason.

Figure 6:
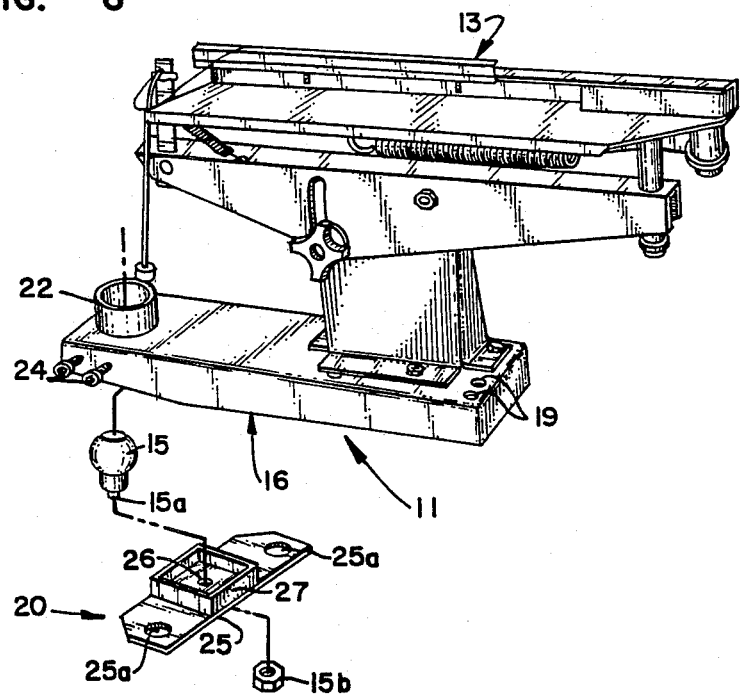
FIG. 6 is an exploded perspective view of the inventive hitch mount device of FIGS. 1-5 with a bumper adapter accessory therefor.

FIG. 6 discloses an adapter accessory 20 for connecting the hitch mounting device 11 to the stepped bumper of a pickup truck or the like. With such bumpers, there is no hitch tongue and the bumper itself bears the entire weight of the trailer tongue. With such trailer hitches, there is no member of conventional thickness corresponding to the trailer tongue 14 upon which the hitch mounting device 11 can be mounted. The adapter 20 provides this function.

More specifically, adapter 20 consists of a thin elongated plate 25 with apertures 25a at each end permitting the adapter 20 to be bolted to the stepped portion of the pickup bumper. A third aperture (not shown) is formed in the center of plate 25, and an annular spacer 26 is disposed over this central aperture. The threaded shank 15a of ball hitch 15 projects through the spacer 26 and central aperture to mount the ball hitch 15 in a slightly elevated position.

Surrounding the spacer 26 is a square sleeve 27 that corresponds dimensionally to the cross sectional size of hitch tongue 14; i.e., the height of sleeve 27 is the same as the tongue thickness, and the side-to-side width of the sleeve 27 corresponds to the cross sectional width of the tongue 14.

Based on these dimensional similarities, the sleeve 27 is received within the channel between sides 16b and threaded blocks 23 of the hitch mounting device 11, and the Allen screws 24 bear directly against the sides of sleeve 27 in clamping relation.

Figure 7:
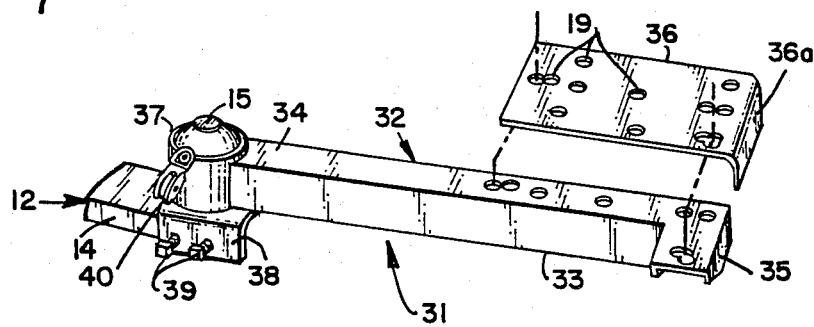
FIG. 7 is a perspective view of a first alternative embodiment of the inventive hitch mount device.

A first alternative embodiment of the inventive hitch mounting device is shown in FIG. 7 and is represented generally by the numeral 31. This embodiment comprises an elongated body 32 taking the form of a steel tube of rectangular cross section having a mounting portion 33 and a hitch connecting portion 34.

The mounting portion 33 has a short stub member 35 of the same square tubular stock welded in perpendicular relation to the main body 32. The stub member 35 increases the effective width of the mounting portion 33 to correspond to the width of body 16 of hitch mounting device 11. An adapter plate 36 corresponding to this width includes the same irregular array of mounting holes 19 and includes a downturned side or lip 36a that bears against the stub member 35 to quickly locate the adapter plate 36. Preferably, the adapter plate 36 is not permanently affixed to the body 32.

The connecting portion 34 of hitch mounting device 31 comprises a cylindrical sleeve welded to the end of body 32, which is formed with an arcuate or concave recess to receive the external surface of sleeve 37. Welded to the bottom of sleeve 37 is a channel member 38 having downturned sides spaced apart to receive the hitch tongue 14. Each of the sides of channel member 38 are formed with threaded bores to receive clamping bolts 39 that may be tightened in clamping relation to the tongue 14.

A small pulley 40 is pivotally mounted to the top edge of cylindrical sleeve 37. Pulley 40 is adapted to receive an elongated trigger actuating draw string 13c of the clay pigeon shooter 13 (see FIGS. 1 and 6), permitting the user to actuate the shooter 13 from a remote position. Alternatively, an eyescrew or eyebolt may perform this function instead of the pulley 40.

Figure 8:
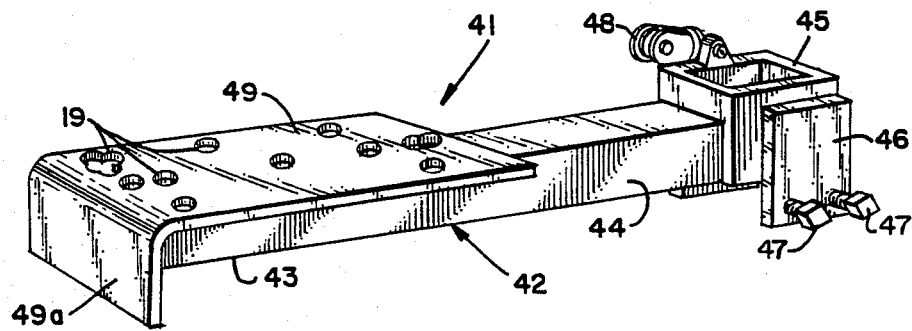
FIG. 8 is a perspective view of a second alternative embodiment of the inventive hitch mount device.
Figure 9:
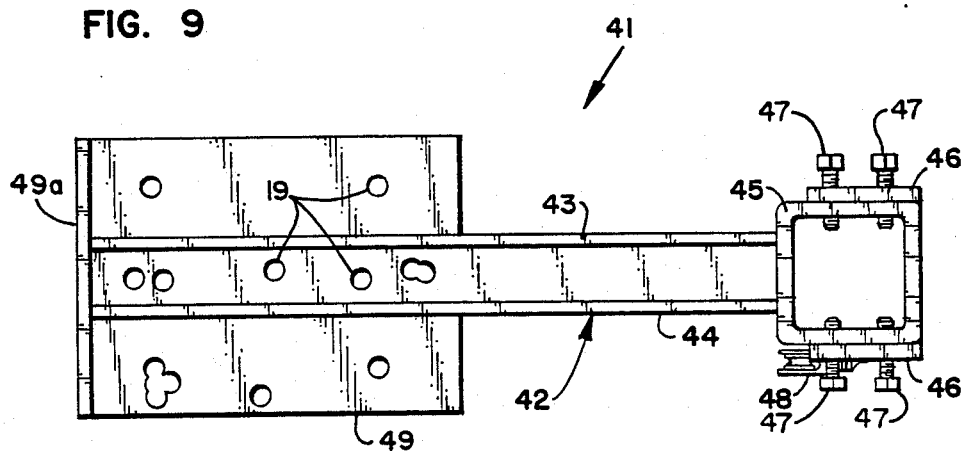
FIG. 9 is a view in bottom plan of the device of FIG. 8.

FIGS. 8 and 9 disclose a second alternative embodiment of the inventive hitch mounting device, which bears the general reference numeral 41. Device 41 has an elongated body 42 formed from channel steel stock, with a mounting portion 43 and a hitch connecting portion or end 44. The mounting portion includes a rectangular mounting plate 49 the width of which corresponds to the width of devices 11 and 31, and which is formed with the same irregular array of mounting holes 19. Plate 49 includes a downturned end or lip 49a that abuts the end of elongated body 42 and is welded thereto. As best shown in FIG. 9, the plate 49 is centered on the elongated body 42, and the underside of plate 49 is also welded to the elongated body 42. Those mounting openings which directly overlie the body 42 are drilled or punched entirely therethrough, as shown in FIG. 9.

The hitch connecting end 44 of device 41 consists of a square tubular sleeve 45 welded in abutting relation to the end of the elongated body 42. The sleeve 45 is sized and oriented to receive the ball hitch 15, having an internal side-to-side dimension corresponding to the internal diameter of cylindrical sleeves 22 and 37.

A pair of side members 46 are welded in face-to-face relation to the sides of sleeve 45. The lower edges of side members 46 project below the sleeve 45 and are disposed in parallel spaced relation with one another. As such, the bottom edge of sleeve 45 and the opposed inner faces of side members 46 define a channel that is sized to receive the trailer tongue 14 therebetween. Two threaded bores are formed along the lower edge of each side member 46 to receive clamping bolts 47 which, as before, are tightened against the sides of tongue 14 in clamping relation.

Device 41 also includes a pivotally mounted pulley 48 to receive the elongated actuating drawstring 13c.

The operation of all three of the inventive hitch mounting devices 11, 31, 41 is the same. The mounting portion of each device includes a cylindrical or square sleeve which fits over the ball hitch 15, and the hitch tongue 14 is received within the bottom facing channel. Tightening of the clamping screws or bolts against the tongue 14 rigidly connects the hitch mounting device to the hitch.

The clay pigeon shooter 13 can thereafter be mounted to the hitch mounting device by appropriate selection of the mounting holes 19, and the shooter 13 may be remotely operated if desired by threading the actuating drawstring through the associated pulley.

The clay pigeon shooter 13 may be permanently mounted to any of the hitch mounting devices 11, 31, 41, so that the user may simply carry the entire assembled unit to the hitch and quickly and easily mount it thereto. Alternatively, the clay pigeon shooter 13 may be removed from the hitch mounting device 11, 31, 41 after each use, which permits the shooter 13 to be mounted elsewhere than on the hitch mounting device.

In the broadest sense, the cylindrical and square ball hitch receiving sleeves are helpful but not essential in the mounting operation. In other words, it is the clamping relation of the clamping bolts or screws against the hitch tongue that rigidly mount the devices 11, 31, 41, and the cylindrical and square sleeves, by virtue of their size, provide only a backup to the mount in the event the clamping bolts or screws become loosened for any reason. It will also be appreciated that, although a plurality of clamping bolts and screws are shown in each embodiment, alternate clamping means, including a single bolt, could satisfactorily perform the clamping function.

In the broadest sense, it is also possible to use any of the three disclosed embodiments to mount objects other than clay pigeon shooters.

What is claimed is:

1. A device for rigidly mounting objects to a trailer hitch having an elongated hitch tongue with a projecting end, the hitch tongue being of generally rectangular cross section defined by opposed sides and top and bottom surfaces, the device comprising:
   a body member comprising a mounting portion for receiving and supporting the object and a hitch connecting portion;
   the hitch connection portion comprising first and second side members disposed in spaced relation and defining a channel therebetween for receiving the hitch tongue with said first and second side members overlying the tongue sides;
   and clamping means on the hitch connecting portion for clamping the hitch connecting portion to said tongue end.

2. The device defined by claim 1, in which the elongated tongue of the trailer hitch includes a hitch ball secured proximate its end, and wherein the body member further comprises an aperture formed in the hitch connecting portion sized to permit said hitch ball to project therethrough.

3. The device defined in claim 2, which further comprises a sleeve member secured to the hitch connecting portion in registration with said aperture, the sleeve member being sized to receive the hitch ball in surrounding relation thereto.

4. The device defined by claim 3, wherein the sleeve member is circular in cross section.

5. The device defined in claim 2, wherein the sleeve member is rectangular in cross section.

6. The device defined by claim 1, wherein said body member is channel shaped, with the side members of the channel shaped body member defining said first and second side members.

7. The device defined by claim 6, wherein the clamping means comprises bolt means operatively threaded through at least one of said first and second sides for clamping engagement with the associated side of said hitch tongue.

8. The device defined by claim 7, wherein the bolt means comprises first and second threaded bolt members operatively carried by each of said first and second side members.

9. The device defined by claim 1, wherein the hitch connecting portion of the body member comprises wedge means carried thereby for elevating the mounting portion of the body member at a predetermined angle.

10. The device defined by claim 1, in which the elongated tongue of the trailer hitch includes a hitch ball secured proximate its end, and wherein the hitch connecting portion of the body member comprises:
    a sleeve member secured to said body member, the sleeve member being sized and disposed to receive said hitch ball in surrounding relation thereto;
    said first and second side members being disposed on the underside of the sleeve member.

11. The device defined by claim 10, wherein the clamping means comprises first and second bolts operatively threaded through each of said first and second sides for clamping engagement with the sides of said hitch tongue.

12. The device defined by claim 10, wherein the mounting portion of said body member comprises a mounting plate and means for removably connecting the mounting plate to said body member.

13. The device defined by claim 1, in which the elongated tongue of the trailer hitch includes a hitch ball secured proximate its end, and wherein the hitch connecting portion of the body member comprises:

a sleeve member secured to said body member, the sleeve member sized and disposed to receive said hitch ball in surrounding relation thereto;

and said first and second side members comprise first and second plate members secured to opposite sides of the sleeve member and projecting therebelow.

14. The device defined by claim 13, wherein the sleeve member is rectangular in configuration.

15. The device defined by claim 13, wherein said clamping means comprises first and second bolts operatively threaded through each of said first and second plate members for clamping engagement with the sides of said hitch tongue.

16. The device defined by claim 13, wherein the mounting portion of said body member comprises a mounting plate and means for removably connecting the mounting plate to said body member.

17. A device for rigidly mounting objects to a trailer hitch, comprising:

a body member comprising a mounting portion for receiving and supporting the object and a hitch connecting portion;

the hitch connecting portion comprising a sleeve member secured to the body member which is sized to receive a hitch ball in surrounding relation thereto;

first and second side members disposed in spaced relation and defining a channel therebetween for receiving the hitch tongue with said first and second side members overlying the tongue sides;

and threaded bolt means carried by one of said first and second side members, the bolt means being constructed and arranged to engage the associated tongue side is clamping relation thereto.

18. The device defined by claim 17, wherein the bolt means comprise a plurality of threaded bolts operatively carried by each of said first and second side members.

* * * * *

UNITED STATES PATENT AND TRADEMARK OFFICE
CERTIFICATE OF CORRECTION

PATENT NO. : 4,867,356

DATED : September 19, 1989

INVENTOR(S) : George R. Melby

It is certified that error appears in the above-identified patent and that said Letters Patent is hereby corrected as shown below:

Abstract, line 15
  "aginst" should be --against--

Col.2, line 16
  after "hitch" insert --mount--

Col. 3, line 15
  "body" should be --mounting--

Col. 3, line 17
  "mounting" should be --body--

Col. 6, lines 20 & 27
  "in" should be --by--

Col. 8, line 16
  "is" should be --in--

Signed and Sealed this

Thirtieth Day of October, 1990

Attest:

HARRY F. MANBECK, JR.

*Attesting Officer*   *Commissioner of Patents and Trademarks*